United States Patent
Ceremis et al.

(10) Patent No.: US 8,528,504 B2
(45) Date of Patent: Sep. 10, 2013

(54) INTERNAL COMBUSTION ENGINE ENHANCEMENT DEVICE AND METHOD

(76) Inventors: Eduardas Ceremis, Lemont, IL (US); Lolita Ceremiene, Lemont, IL (US)

(*) Notice: Subject to any disclaimer, the term of this patent is extended or adjusted under 35 U.S.C. 154(b) by 375 days.

(21) Appl. No.: 12/978,612

(22) Filed: Dec. 26, 2010

(65) Prior Publication Data

US 2012/0031352 A1     Feb. 9, 2012

Related U.S. Application Data

(60) Provisional application No. 61/372,544, filed on Aug. 11, 2010, provisional application No. 61/371,729, filed on Aug. 8, 2010.

(51) Int. Cl.
*F02B 43/08*     (2006.01)

(52) U.S. Cl.
USPC .......... 123/3; 123/1 A; 123/DIG. 12

(58) Field of Classification Search
USPC .................. 123/1 A, 3, DIG. 12
See application file for complete search history.

(56) References Cited

U.S. PATENT DOCUMENTS

| 4,411,223 A | 10/1983 | Kiely |
| 4,442,801 A | 4/1984 | Glynn et al. |
| 4,543,246 A | 9/1985 | Houser |
| 7,458,368 B1 | 12/2008 | Huffman |

FOREIGN PATENT DOCUMENTS

FR     2893355 A1 *     5/2007

OTHER PUBLICATIONS

PCT International Search Report and Written Opinion—Apr. 6, 2012.
PCT International preliminary report on patentability Feb. 21, 2013.

* cited by examiner

*Primary Examiner* — Noah Kamen
(74) *Attorney, Agent, or Firm* — Clifford Kraft

(57) ABSTRACT

A device that injects hydrogen gas into an engine's air intake or intake manifold that is demand controlled by the vehicle's throttle linkage in an approximately linear manner. When the throttle is depressed, hydrogen generation can start or increase, and when the throttle is released, hydrogen generation can stop of decrease. The device of the present invention uses the vehicle's own vacuum to control the production of hydrogen by forcing a liquid to rise in a chamber and into contact with metal in response to increasing vacuum thus producing an increasing amount of hydrogen gas with increasing throttle depression.

12 Claims, 4 Drawing Sheets

INTERNAL COMBUSTION ENGINE ENHANCEMENT DEVICE AND METHOD

This application is related to and claims priority from U.S. Provisional patent applications Nos. 61/372,544 filed Aug. 11, 2010 and 61/371,729 filed Aug. 8, 2010.

BACKGROUND

1. Field of the Invention

The present invention relates generally to the field of internal combustion engines and more particularly to a device that tremendously enhances the performance of any internal combustion engine.

2. Description of the Problem

It is known in the art to inject hydrogen gas into the air intake of an internal combustion engine to enhance performance. Several devices are on the market that create hydrogen electrolytically from water or other liquids. Also zinc/acid combinations have been used. These methods suffer from having to supply electricity to the device, inability to control the amount of gas produced, corrosive acids, and danger of electrical shock. It would be tremendously advantageous to have a device that could produce hydrogen gas on demand from the vehicle's throttle which can then be injected into the air intake of the engine.

SUMMARY OF THE INVENTION

The present invention relates to a device that can provide hydrogen gas into an engine's air intake that is demand controlled by the vehicle's throttle linkage. When the throttle is pressed, hydrogen generation can start or increase, and when the throttle is released, hydrogen generation can stop of decrease. The device of the present invention uses the vehicle's own vacuum to control the production of hydrogen by forcing a liquid to rise in a chamber and into contact with a metal in response to increasing vacuum, thus producing an increasing amount of hydrogen gas with increasing throttle depression.

DESCRIPTION OF THE FIGURES

Attention is now directed to several figures that illustrate aspects and features of the present invention.

Several drawings and illustrations have been provided to aid in understanding the features of the present invention. The scope of the present invention is not limited to what is shown in the figures.

DESCRIPTION OF THE INVENTION

The present invention is directed toward a vacuum controlled device that can produce hydrogen gas on demand, and under control of a vehicle's throttle as needed, for injecting into the air intake of an internal combustion engine. The present invention can be used with virtually any internal combustion engine (including diesel engines) and finds applications in cars, trucks, boats, ships, locomotives, agricultural machines, military vehicles and other devices such as mobile power stations, generators and any other internal combustion engines using gasoline, diesel, natural gas, propane or any other fuel.

Figure 1:
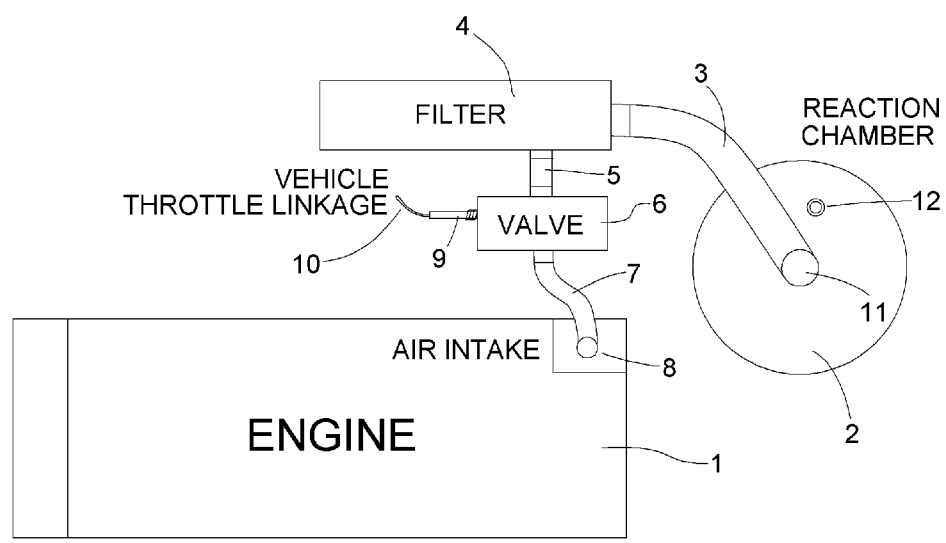
FIG. 1 shows a block diagram of an embodiment of the present invention used in conjunction with an internal combustion engine.

Turning to FIG. 1, a block diagram of an embodiment of the present invention is seen. The internal combustion engine 1 has an air intake 8 where flow into the air intake is controlled by a valve 6 that is coupled to the vehicle's throttle linkage 9, 10. A parallel path of regular air (not shown) can optionally be supplied into the air intake at this point if desired. A reaction chamber 2 that can produce hydrogen in quantity and demand to vacuum can be located near the engine 1. The air intake 8 can be connected through a hose 7 to the valve 6. The reaction chamber 2 can be connected from its gas outlet 11, through a hose 3 to a filter 4. The filter 4 can be connected through a hose 5 to the valve 6. An open inlet port 12 on the reaction chamber allows air to enter and be pulled through the chamber in response to the vacuum.

The filter 4 is optional, but generally recommended to clean the hydrogen produced by a chemical reaction in the reaction chamber 2. With no filter, liquid and other byproducts of the reaction might be drawn into the engine 1. The filter 4 and chemical elements of the reaction chamber 2 are parts that can be replaced after a certain amount of usage.

Figure 2:
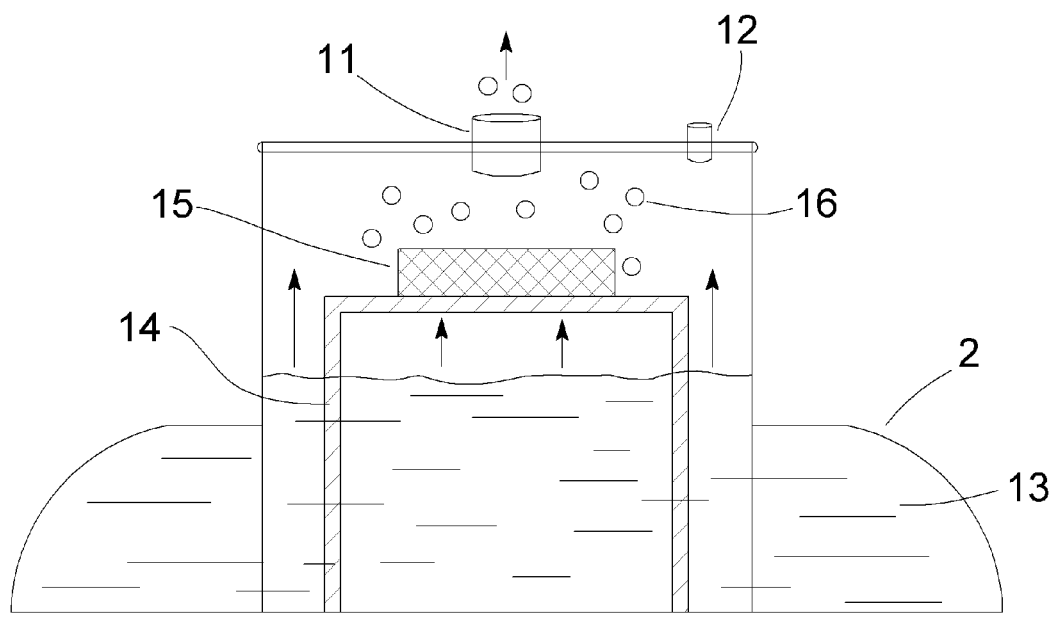
FIG. 2 shows a schematic of the internal construction of an embodiment of the present invention.

FIG. 2 shows a schematic drawing of an embodiment of the reaction chamber 2. The chamber 2 contains a quantity of liquid 13 that, under a no-vacuum condition, rests at a particular surface level measured vertically. A support 14 holds a piece or block of metal 15 on a platform just above the no-vacuum resting surface level of the liquid 13, with bottom and side surfaces exposed. When vacuum is drawn in the main exit portal 11 caused by depressing the vehicle's throttle, the liquid is pulled upward in the reaction chamber and into contact with the metal 15. The more vacuum pulled, the more surface contact with the metal. Since the liquid 13 in contact with the metal 15 produces hydrogen gas 16, the amount of vacuum directly controls the rate of hydrogen production. A portal 12 open to the atmosphere allows some air to be drawn into the chamber 2 so that the mixture leaving the chamber 2 via the exit portal 11 contains air mixed with hydrogen. The open portal 12 is normally smaller in diameter than the exit portal 11. The result is a system where engine vacuum under control of the throttle controls the rate of hydrogen injection into the engine.

Any combination of liquid/metal that produces hydrogen gas can be used in the chamber 2; however, the preferred liquid is a solution of Sodium Hydroxide, and the preferred metal is Aluminum. Sodium hydroxide (lye) can be considered a reactant or catalyst to make the liquid water react with the metal. Other catalysts are not necessary with this particular combination. Any liquid/metal combination that produces hydrogen gas, when the metal is in contact with the liquid, with or without an additional catalyst, is within the scope of the present invention. Any catalyst of any type that enhances the reaction is also within the scope of the present invention; however, as stated the lye/water combination generally does not need any other catalyst to react.

The minimum requirement for a system is around one milliliter of liquid (water), around one milligram of metal (aluminum) and around one milligram of reactant (NaOH). Any other quantities or combinations may be used. In a typically automobile or vehicle use, the reaction chamber can be around 5-6 inches in diameter, contain from 1 to 4 liters of solution and contain a bar or block of metal of several grams up to several hundred grams. A preferred concentration of NaOH in water is between 5% to 15%. It should be noted that the reaction described does not need extra heat and does not produce excessive heat itself. Therefore, there is no need to externally cool the reaction. No electric current is required, and the solution is not excessively corrosive. Even though the solution as described generally has a depressed freezing point over pure water, to prevent freezing on particularly cold days or in particularly cold climates, a small amount of alcohol or glycol can be added to the mixture without any adverse effect on the reaction.

The rate that the metal is dissolved depends on usage including city or rural driving, speed driven, etc. A typical auto arrangement can generally last around 5000 miles or more. At that point, the liquid and metal can be refreshed, and the filter replaced. This can be done in conjunction with an oil change or other routine maintenance. Any other replacement interval is within the scope of the present invention.

Figure 3:
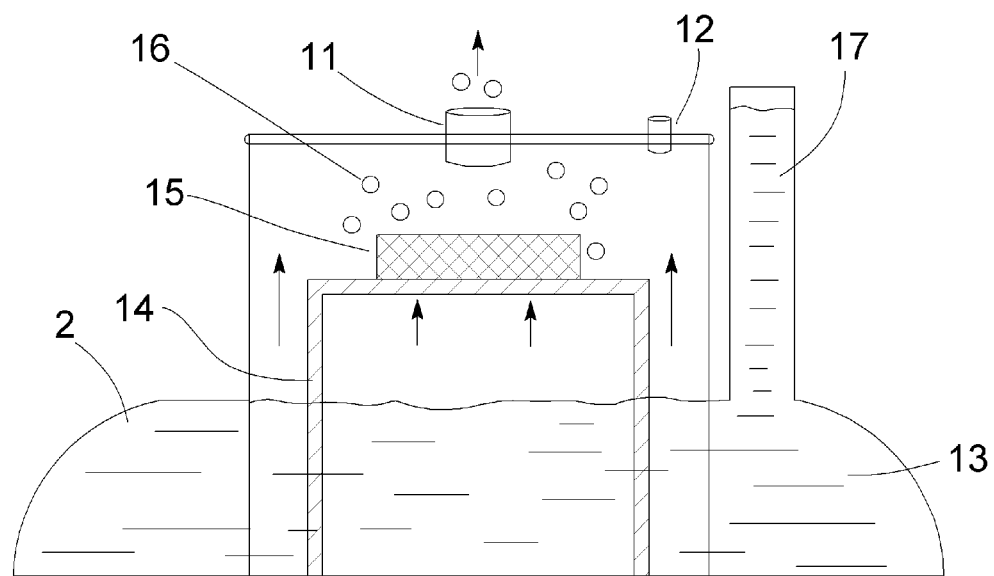
FIG. 3 shows the embodiment of FIG. 2 with an atmospheric balance tube.

As previously stated, when the driver applies throttle, the vehicle's vacuum increases causing the surface of the liquid 13 in the chamber 2 to rise and contact the bottom and/or side surface of the metal 15, and upon further rising, contact the sides and possibly even the top surface of the metal 15. The height of the metal should be sufficient to create an increasing, approximately linear, increase of hydrogen production as the level rises. Saturation will occur when the metal is completely submerged. This point should be chosen near full throttle depression. In a typical vehicle application, the height can be from several centimeters to even a lot more. The rate of liquid rise depends on the diameter of the chamber 2 as well as the amount of vacuum supplied above the liquid. Automobile engines typically produce between 90-100 kPa of manifold pressure (vacuum). The chamber diameter and metal height can be chosen to produce the desired gas production gradient for a given engine or engine/vehicle class. Generally, for the liquid to rise in response to decreasing air pressure on its top surface (caused by increase vacuum above it), the liquid must display a second surface to the atmosphere. This can be achieved using a U-shaped or an open balance tube 17 shown in FIG. 3, or any other arrangement that presents a second liquid surface to the atmosphere. This allows the liquid to flow up and down in direct response to increasing or decreasing vacuum. Any method or arrangement that allows the liquid surface level to rise and fall in direct response to vacuum is within the scope of the present invention.

The chamber can be made of any material that is not affected by the reactants; the hosing can be standard rubber hose with the preferred reactants described. The filter 4 can be any filter that will remove reactant and other impurities from the gas. Fiber filters as well as charcoal filters or any other filters can be used. The filter 4 must allow vacuum buildup, and allow sufficient air flow and gas to pass through.

Figure 4:
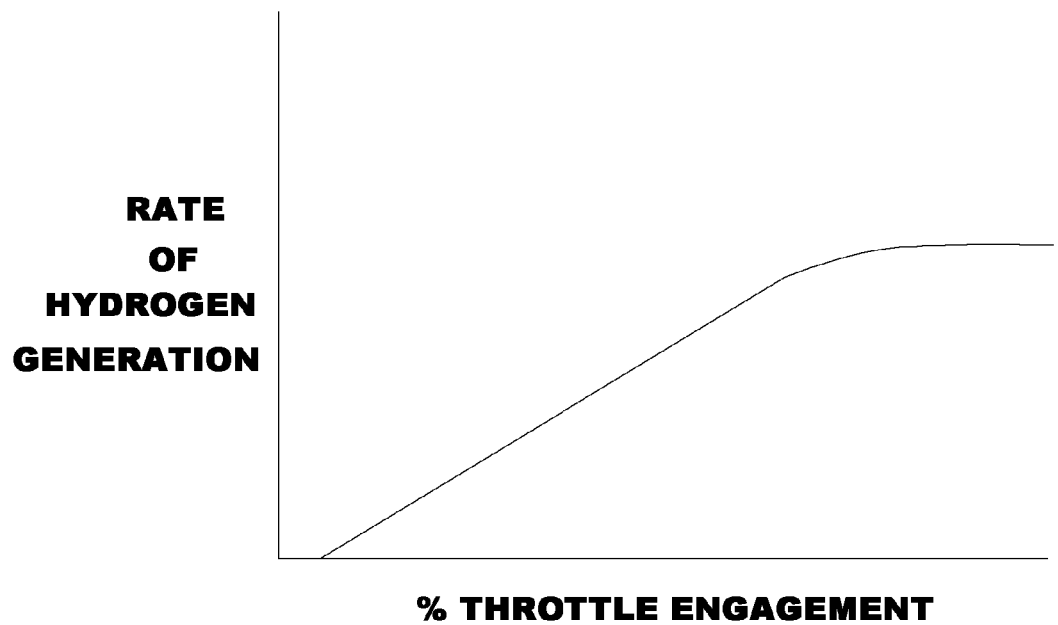
FIG. 4 shows a graph of throttle engagement vs. hydrogen production.

FIG. 4 shows a graph of throttle depression or engagement and rate of hydrogen production for a typical embodiment of the present invention. It can be seen that the relationship is approximately linear until the block becomes completely submerged. The normal operating range should generally be chosen so that the block is not normally totally submerged.

Use of the present invention can result in a tremendous increase in gas mileage for vehicles with internal combustion engines and a tremendous increase in efficiency for other engines. With fuel injected vehicles, it may be necessary to adjust injector pulse width and/or ignition timing to achieve maximum efficiency with injected hydrogen. Any system that adjusts injector pulse width and/or timing should preferably revert back to normal settings whenever no hydrogen is being produced (say because of an expended or faulty hydrogen generation system). An optional hydrogen sensor can sense this condition.

Several descriptions and illustrations have been presented to aid in understanding the present invention. One of skill in the art will realize that numerous changes and variations can be made without departing from the spirit of the invention. Each of these changes and variations is within the scope of the present invention.

We claim:

1. A hydrogen production device used to inject hydrogen gas into a gasoline or diesel engine's air intake at a rate determined approximately linearly by throttle depression comprising;
   a chamber containing a sodium hydroxide reactant liquid having a resting surface substantially level in said chamber;
   said chamber also containing a platform holding a block of aluminum metal above said resting surface level;
   said chamber having an air attachment to said gasoline or diesel engine's air intake, wherein increasing vehicle throttle depression results in increased vacuum in said chamber;
   said chamber and said block of aluminum metal adapted so that increased vacuum in said chamber causes said sodium hydroxide reactant liquid to rise above said resting level and contact said aluminum metal producing hydrogen gas which then enters said engine's air intake;
   said block of aluminum metal having height sufficient to create an approximately linear increase of hydrogen production as said sodium hydroxide reactant liquid rises in said chamber.

2. The hydrogen production device of claim 1 wherein said sodium hydroxide reactant liquid is a 5% to 15% solution of sodium hydroxide in water.

3. The hydrogen production device of claim 1 wherein said block of aluminum metal is removably mounted to said platform.

4. The hydrogen production device of claim 1 adapted to allow said block of metal and said reactant liquid to be changed out on a periodic schedule.

5. A hydrogen production device used to inject hydrogen gas into a gasoline or diesel engine's air intake at a rate determined by throttle depression comprising;
   a chamber containing a sodium hydroxide reactant liquid having a resting surface substantially level in said chamber;
   said chamber also containing a platform holding a block of metal above said resting surface level;
   said chamber having an air attachment to said gasoline or diesel engine's air intake, wherein increasing vehicle throttle depression results in increased vacuum in said chamber;
   said chamber and said block of metal adapted so that increased vacuum in said chamber causes said sodium hydroxide reactant liquid to rise above said resting level and contact said metal producing hydrogen gas which then enters said engine's air intake;
   said block of metal having height sufficient to create an approximately linear increase of hydrogen production as said sodium hydroxide reactant liquid rises in said chamber.

6. The hydrogen production device of claim 5 wherein said sodium hydroxide reactant solution contains from 5-15% sodium hydroxide.

7. The hydrogen production device of claim 5 wherein said block of metal is aluminum.

8. The hydrogen production device of claim 5 adapted to allow said reactant solution and said block of metal to be periodically replaced.

9. A method of injecting hydrogen gas into an engine's intake manifold in a manner approximately proportional to throttle engagement comprising:

provide a reaction chamber containing a sodium hydroxide reactant liquid, said reaction chamber being gas coupled to said intake manifold;

providing a block of aluminum metal in said reaction chamber positioned so that at a first manifold pressure said block of aluminum metal does not contact said reactant liquid and at a second manifold pressure, said block of aluminum metal does contact said reactant liquid, wherein said block of aluminum metal in contact with said sodium hydroxide reactant liquid produces hydrogen gas at a rate approximately linearly proportional to increasing manifold pressure.

10. The method of claim 9 wherein said sodium hydroxide reactant liquid has a concentration of between 5% and 15% of sodium hydroxide.

11. The method of claim 9 further comprising the allowing periodic replacement of said sodium hydroxide reactant liquid and said block of aluminum metal.

12. The method of claim 9 further comprising injecting said hydrogen gas into an automobile intake manifold.

\* \* \* \* \*